(12) United States Patent
Railkar et al.

(10) Patent No.: US 11,629,499 B2
(45) Date of Patent: Apr. 18, 2023

(54) CONTOURED MESH RIDGE VENTS

(71) Applicant: Building Materials Investment Corporation, Dallas, TX (US)

(72) Inventors: Sudhir Railkar, Wayne, NJ (US); Adem Chich, Kearny, NJ (US); Walter Zarate, Prospect Park, NJ (US)

(73) Assignee: BMIC LLC, Dallas, TX (US)

( * ) Notice: Subject to any disclaimer, the term of this patent is extended or adjusted under 35 U.S.C. 154(b) by 19 days.

(21) Appl. No.: 16/143,026

(22) Filed: Sep. 26, 2018

(65) Prior Publication Data
US 2019/0024378 A1 Jan. 24, 2019

Related U.S. Application Data

(63) Continuation of application No. 14/133,926, filed on Dec. 19, 2013, now abandoned.

(60) Provisional application No. 61/740,085, filed on Dec. 20, 2012.

(51) Int. Cl.
| E04D 13/17 | (2006.01) |
| H02S 20/23 | (2014.01) |
| E04D 3/30 | (2006.01) |
| F24S 20/69 | (2018.01) |
| E04D 1/30 | (2006.01) |

(52) U.S. Cl.
CPC ............ *E04D 13/174* (2013.01); *E04D 3/30* (2013.01); *E04D 13/172* (2013.01); *F24S 20/69* (2018.05); *H02S 20/23* (2014.12); *E04D 2001/305* (2013.01); *Y02B 10/10* (2013.01); *Y02B 10/20* (2013.01); *Y02E 10/44* (2013.01)

(58) Field of Classification Search
CPC ....... E04D 13/174; E04D 3/30; E04D 13/172; E04D 2001/305; F24S 20/69; Y02B 10/20; Y02E 10/44

USPC ......................................................... 454/365
See application file for complete search history.

(56) References Cited

U.S. PATENT DOCUMENTS

| 1,319,763 A | 10/1919 | Drew |
| 4,276,732 A | 7/1981 | Nielsen |
| 4,554,862 A | 11/1985 | Wolfert |
| 4,604,110 A | 8/1986 | Frazier |
| 4,765,915 A | 8/1988 | Diehl |
| 4,876,950 A | 10/1989 | Rudeen |
| 4,942,699 A | 7/1990 | Spinelli |
| 5,136,980 A | 8/1992 | Schoeber et al. |
| 5,167,579 A * | 12/1992 | Rotter ................ E04D 13/176 454/365 |

(Continued)

FOREIGN PATENT DOCUMENTS

CA 2317238 9/2001

OTHER PUBLICATIONS

Owens Corning. Innovations for Living. "VentSure® Rigid Roll Ridge Vents with Weather PROtector® Moisture Barrier." Two pages.

*Primary Examiner* — David J Laux
(74) *Attorney, Agent, or Firm* — Womble Bond Dickinson (US) LLP

(57) ABSTRACT

Ridge vents and deck covers are disclosed that have a fibrous mesh mat and a moisture barrier. The mesh mat may be contoured to define a variety of structures and may have regions of relatively higher fiber density and regions of relatively lower fiber density. Solar cells may be exposed on the ridge vents to collect solar energy when the vents are exposed to sunlight.

17 Claims, 5 Drawing Sheets

(56) References Cited

U.S. PATENT DOCUMENTS

| | | |
|---|---|---|
| 5,425,672 A | 6/1995 | Rotter |
| 5,528,872 A | 6/1996 | Rotter |
| 5,561,953 A | 10/1996 | Rotter |
| 5,772,502 A | 6/1998 | Smith |
| 5,960,595 A | 10/1999 | McCorsley, III et al. |
| 6,015,343 A | 1/2000 | Castillo et al. |
| 6,077,159 A * | 6/2000 | Clayton ................ F24F 7/003 454/260 |
| 6,298,613 B1 * | 10/2001 | Coulton ............... E04D 13/176 454/366 |
| 6,343,985 B1 | 2/2002 | Smith |
| 6,902,476 B2 | 6/2005 | Rotter |
| 6,924,326 B2 | 8/2005 | Meyer et al. |
| 6,981,916 B2 | 1/2006 | Coulton |
| 7,044,993 B1 | 5/2006 | Bolduc |
| 7,182,688 B2 | 2/2007 | Coulton |
| 7,287,650 B2 | 10/2007 | Koslow |
| 7,393,273 B2 | 7/2008 | Ehrman et al. |
| 7,422,520 B2 | 9/2008 | Coulton et al. |
| 7,594,363 B2 * | 9/2009 | Polumbus ............ E04D 13/174 454/366 |
| 7,662,462 B2 | 2/2010 | Noda et al. |
| 2004/0093812 A1 * | 5/2004 | Rotter ................... E04D 13/174 52/199 |
| 2004/0132401 A1 | 7/2004 | Rotter |
| 2005/0126088 A1 | 6/2005 | Rotter |
| 2006/0035582 A1 | 2/2006 | Collister et al. |
| 2006/0154597 A1 | 7/2006 | Coulton et al. |
| 2006/0264141 A1 | 11/2006 | Choi |
| 2006/0272542 A1 | 12/2006 | Horner |
| 2007/0026216 A1 | 2/2007 | Weingartner et al. |
| 2007/0039252 A1 | 2/2007 | Railkar et al. |
| 2007/0116987 A1 | 5/2007 | Khan et al. |
| 2008/0125028 A1 | 5/2008 | Morris et al. |
| 2009/0253368 A1 | 10/2009 | Rotter |
| 2010/0269343 A1 | 10/2010 | Ward et al. |
| 2011/0189940 A1 | 8/2011 | Kerwood-Winslow et al. |
| 2013/0165038 A1 | 6/2013 | Railkar et al. |
| 2014/0202093 A1 * | 7/2014 | Knighton ............. E04D 13/174 52/198 |
| 2014/0357181 A1 * | 12/2014 | Stouffer ............... E04D 13/174 454/367 |
| 2016/0312474 A1 * | 10/2016 | Knighton ................. E04B 7/02 |

* cited by examiner

CONTOURED MESH RIDGE VENTS

REFERENCE TO RELATED APPLICATION

This is a continuation of U.S. patent application Ser. No. 14/133,926 filed on Dec. 19, 2013 and entitled Contoured Mesh Ridge Vents, which claims priority to the filing date of U.S. provisional patent application 61/740,085 filed on Dec. 20, 2012 and bearing the title Contoured Mesh Ridge Vents.

TECHNICAL FIELD

This disclosure relates generally to attic ventilation and more specifically to open weave mesh material that can be used to cover a ridge slot along the ridge of a roof or a hip slot along a hip of a roof to provide attic ventilation.

BACKGROUND

To ventilate an attic space, it is common to form a ridge slot in the roof deck extending along a ridge of the roof and to install a ridge vent over the ridge slot in conjunction with installation of soffit ventilation. For hip roofs, it is common to form a hip slot along a hip of the roof and cover the hip slot with a hip vent to provide ventilation. This disclosure will be couched primarily within the context of ridge vents for ease of explanation, but the invention is applicable to hip vents and indeed other attic ventilation devices. A ridge vent permits heated air from the attic below to pass by convection through the ridge slot and through the vent while preventing ingress of water, insects, and vermin into the attic. One common type of ridge vent is the so-called rollable mesh ridge vent. One rollable mesh ridge vent that has been commercially successful is the ridge vent and system disclosed in U.S. Pat. No. 5,167,579 of Rotter entitled Roof Vent of Synthetic Fiber Matting. This patent is hereby incorporated fully by reference. Generally, the Rotter ridge vent is a unitary sheet construction of randomly aligned synthetic fibers that are open and blended, randomly aligned into a web by airflow, joined by phenolic or latex binding agents, and heat cured to produce an air-permeable mat with a substantially constant fiber density throughout. The vent is fabricated in substantial lengths and is rolled into a roll for storage and shipment. For installation, the vent is unrolled along a roof ridge covering a ridge slot and secured to the roof decking on either side of the slot. Ridge cap shingles are then installed atop the ridge vent to form a moisture barrier and to present a traditional appearance. Warm air from the attic below passes through the ridge slot, flows through the mesh mat of the ridge vent, and exits along the edges of the ridge vent to ambience.

While the Rotter ridge vent has proven successful, it nevertheless suffers from certain inherent shortcomings. For example, the fibrous mat material of the Rotter ridge vent has a substantially constant fiber density throughout, and is air and water permeable throughout. Thus, ridge cap shingles are required to prevent water from penetrating through the mat and into the attic below. The Rotter ridge vent also has a constant thickness throughout, even though not all regions of the ridge vent require this thickness for the vent to function properly. There is thus a certain waste of material in such regions of the Rotter ridge vent. Centering the Rotter ridge vent across a ridge slot also can be imprecise since an installer generally centers the mat by eye, which can result in more of the mat on one side of the ridge slot than on the other side of the ridge slot. The Rotter ridge vent also lacks wind baffles found on more expensive injection molded plastic ridge vents, and such wind baffles can improve ventilation efficiency. These are only a few examples of shortcomings of the Rotter ridge vent.

Needs exist for fiber mesh attic vents and ridge vents in particular that address these and other shortcomings of traditional mesh ridge vents such as the Rotter ridge vent. It is to the provision of a variety of mesh-type ridge vent configurations that address these and other needs and that provide other advantages that the present invention is primarily directed.

SUMMARY

Briefly described, a plurality of mesh-type ridge vent configurations are disclosed that each provides certain benefits not currently found in commercial fiber mesh ridge vents. The disclosed ridge vents may incorporate regions having relatively lower fiber density to allow air to ventilate efficiently and regions with higher fiber density to form moisture barriers, support structures, or other structures of the vents. Disclosed vents may have integral moisture barriers, alignment tabs, special contours for functional and aesthetic advantages, interlocking ends, solar panel integration, ambient light admittance, and other unique features representing enhancements and improvements over traditional Rotter style fiber mesh ridge vents. These and other aspects, features, and advantages of the disclosed ridge vent configurations will become more apparent upon review of the detailed description set forth below taken in conjunction with the accompanying drawing figures, which are briefly described as follows.

DETAILED DESCRIPTION

Figure 1:
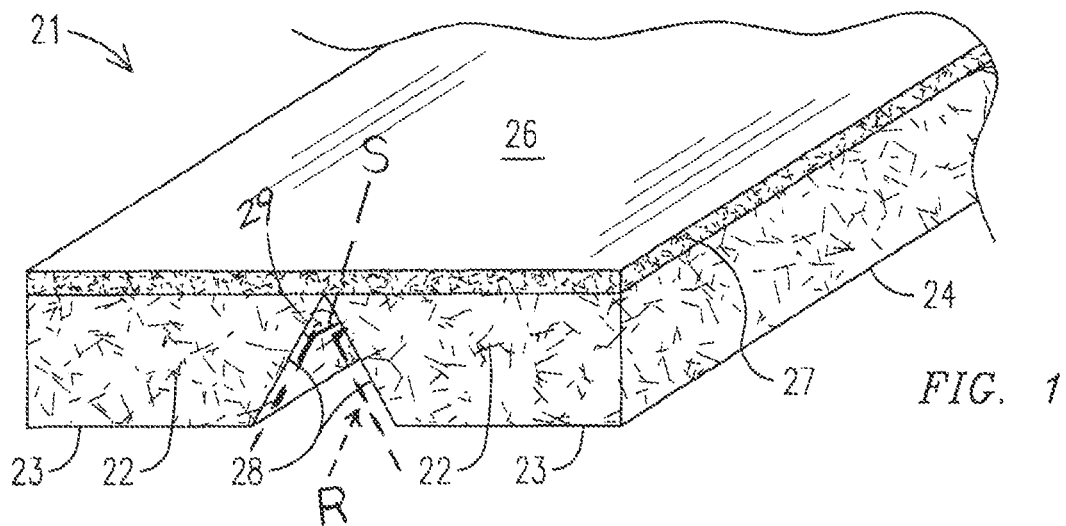
FIG. 1 is a perspective view of a mesh ridge vent having a central fold notch formed there to facilitate accurate folding of the ridge vent along its center line.

Reference will now be made in more detail to the drawing figures, which illustrate a variety of ridge vent and deck cover configurations according to the invention. The disclosed products incorporate air permeable portions formed from a sheet, strip, or mat constructed of randomly aligned synthetic fibers that are open and blended; randomly aligned into a web by airflow, air-laid techniques, needling techniques, or other means; joined by phenolic or latex binding agents; and heat cured to produce an air-permeable mat. Such a mat is disclosed in U.S. Pat. No. 5,167,579 of Rotter entitled Roof Vent of Synthetic Fiber Matting. This patent is hereby incorporated fully by reference. The terms mat, mesh, fibrous mesh, and similar terms may be used throughout this disclosure to refer to air permeable fibrous mats.

The various ridge vents and deck cover configurations disclosed herein also contemplate a fibrous mat in which selected portions of the mat are formed with a relatively higher fiber density and other portions of the mat are formed with a relatively lower fiber density. Varying fiber density within fibrous mats can be achieved in a number of known ways such as through needling techniques and/or covering or exposing, as needed, classification apertures in the distribution devices of an air-laid system, or by the use of air streams, water jets, and the like to move fibers to desired locations before the binder is applied and/or cured. Regardless of the technique, the result can be a fibrous mat with higher fiber density in some portions of the mat and lower fiber density in other portions. Some of these fabrication techniques also can be used to create structures such as notches, channels, support features, wind baffles, and the like as a part of the fabrication process.

The term "moisture barrier" will be used in the detailed description below to refer to a layer or layers of material on or in a fibrous mat that are substantially impervious to water or moisture. This term should be understood to encompass any structure or structures that can be used to prevent penetration of water including, without limitation, a coating of water resistant material applied by spraying, rolling, calendaring, or otherwise onto a fibrous mat; a membrane attached, affixed, bonded, or adhered to the fibrous mat; a layer of high fiber density on or in the mat; a layer of fibers containing sufficient amounts of resins to close the spaces between the fibers; a water impervious mat of fibers adhered or otherwise fixed to an underlying air permeable fibrous mat; and any other structure or material that forms a barrier to the entry of moisture. For the sake of clarity and brevity, the term "moisture barrier" when used below is intended to encompass any and all of these structures, materials, and techniques for substantially preventing the passage of water and moisture, whether used alternatively or in combination with each other.

FIG. 1 illustrates a ridge vent 21 comprising an air permeable mat 22 having a moisture barrier 26 forming the top or exposed surface of the ridge vent. A longitudinally extending notch 28 is formed in the mat 22 extending generally along the centerline of the ridge vent 21. The notch 28 is generally V-shaped in the illustrated embodiment, but may be of any other useful shape as needed. The notch 28 divides the mat 22 into first and second sections 23 on either side of the notch. The notch 28 facilitates the bending of the ridge vent 21 along its center line for installation along the ridge R of a roof, covering a ridge slot or ventilation slot S, and with a longitudinally extending air gap 29 defined along a bottom side of the mat 22. The notch 28 can be formed by cutting the mat during fabrication, by attaching the first and second sections 23 to the moisture barrier 26 as separate pieces, or by modifying the needling or air-laying process or using air or fluid jets to displace fibers during fabrication so that fibers are not present in the area of the notch.

Figure 2:
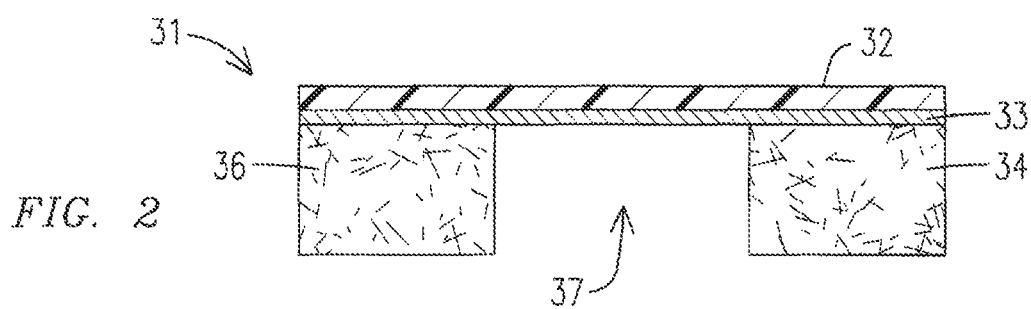
FIG. 2 is an end view of a mesh ridge vent having a central space flanked by mesh material.

FIG. 2 is a lateral cross sectional view of a ridge vent 31 having a moisture barrier 32 and a pair of fiber mesh strips 34 and 36 depending therefrom. An open gap 37 is defined between the mesh strips and this open gap overlies a ridge slot when the ridge vent 31 is installed along the ridge of a roof. The mesh strips 34 and 36 may be attached to the moisture barrier 32 by any appropriate means such as, for example, a peel-and-stick membrane 33 as shown in the illustrated embodiment. If the moisture barrier 32 is a layer of dense fibers, it may be adhered with adhesive or may be formed as a unitary layer during the air-laid or other process used to fabricate the ridge vent 31.

Figure 3:
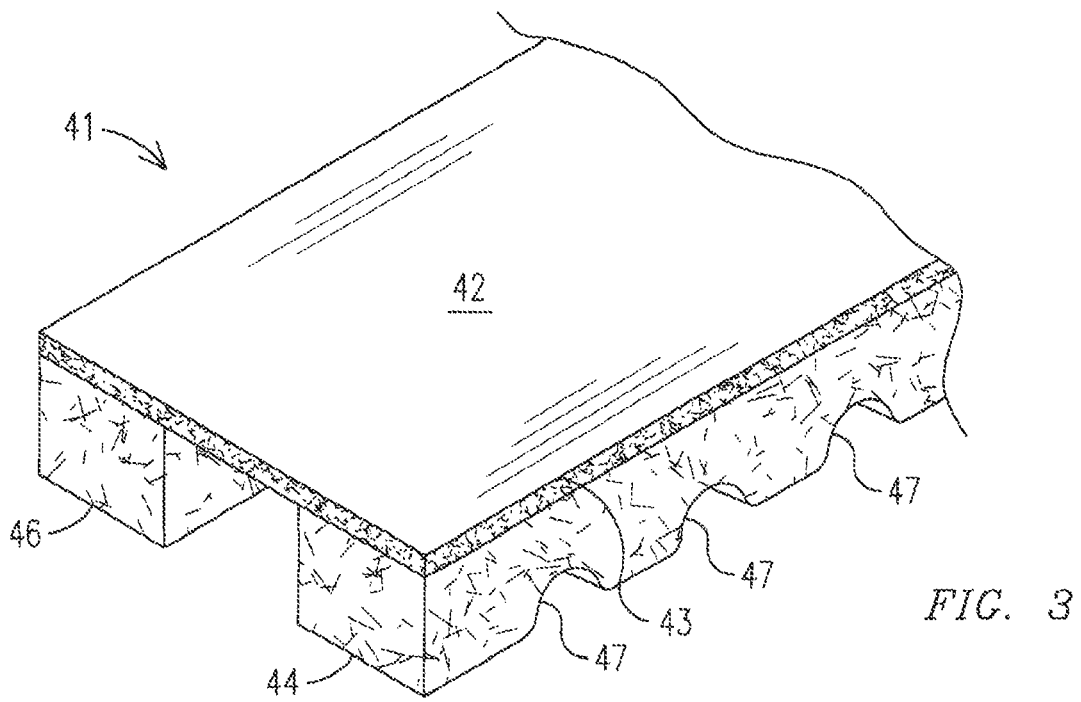
FIG. 3 is a perspective view of a mesh ridge vent formed with lateral slots allowing the ridge vent to be used on metal roofs having standing seams.

FIG. 3 is a perspective view of a ridge vent 41 having a moisture barrier 42 and a pair of mesh strips 44 and 46 depending from the edge portions of the moisture barrier. An open gap is formed between the mesh strips 44 and 46 as in the embodiment of FIG. 2 and overlies a ridge slot when the ridge vent 41 is installed. Laterally extending depressions or notches 47 are formed in the mesh strips 44 and 46. In this embodiment, the lateral notches are generally curved in shape, but this is not a limitation and they may be otherwise configured. The ridge vent 41 is configured to be installed along the ridge of a tin or metal roof having upstanding ridges or standing seams. The laterally extending notches 47 are spaced, sized, and configured to fit over and rest against the ridges or standing seams to form a barrier against windblown rain and vermin. In the illustrated example, the moisture barrier 42 is formed of a layer of dense fibers and binders that prevent penetration of water.

Figure 4:
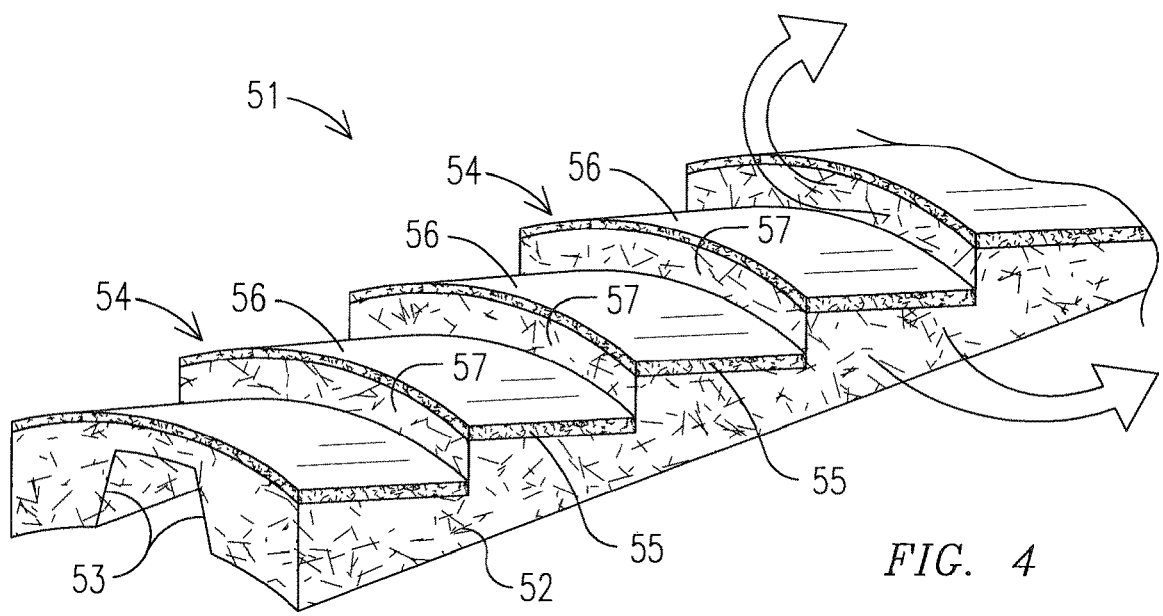
FIG. 4 is a perspective view of a mesh ridge vent with an upper surface contoured to resemble ridge cap shingles.

FIG. 4 is a perspective view of a ridge vent 51 formed of an air permeable fiber mesh material 52. The mesh material 52 is shaped on its underside during the fabrication process to define a pair of depending legs separated by a gap 53. The gap 53 overlies a ridge slot when the ridge vent 51 is installed along the ridge of a roof. The upper side of the mesh material 52 is formed during fabrication to define a series of sloped lands 56 and risers 57. The lands 56 are covered with a moisture barrier 55, but the mesh material 52 is left exposed on the risers 57. When the ridge vent 51 is installed along the ridge of a roof, the gap 53 overlies a ridge slot formed along the ridge and the lands and risers mimic the look of ridge cap shingles installed along the ridge. Thus, ridge cap shingles need not be installed atop the ridge vent as is the case with traditional mesh ridge vents; although ridge cap shingles may be installed. If installed, one edge of each ridge cap shingle preferably overhangs the riser of its land to help shield the riser from windblown rain and the like. Further, heated air from the attic space below can rise through convection into the gap 53 from where it can vent to ambience both laterally along the edges of the ridge vent and longitudinally through the risers 57 of the ridge vent, as indicated by the arrows in FIG. 4. Improved ventilation and appearance are thus aspects of the ridge vent configuration of FIG. 4.

Figure 5:
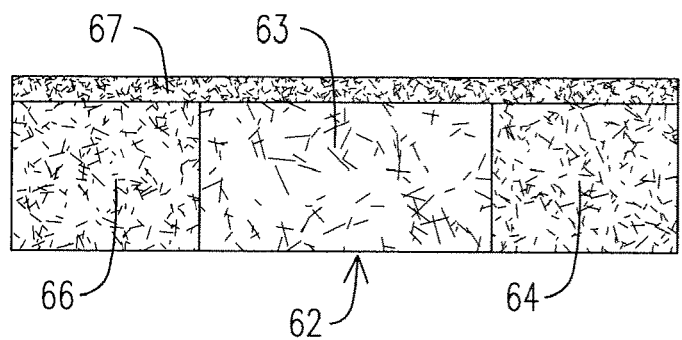
FIG. 5 is an end view of a mesh ridge vent having relatively more dense edges and a relatively less dense central portion.

FIG. 5 is a lateral cross section of a ridge vent 61 of another configuration. The ridge vent 61 has a moisture barrier 67 from which a fiber mesh mat 62 depends. The mesh mat 62 is continuous across the width of the ridge vent, but is formed during fabrication with a relatively less dense central portion 63 and relatively more dense edge portions 64. The relatively less dense central portion 63 is less resistant to the flow of hot air from an attic space below while the relatively more dense portions 64 allow the air to escape to ambience while preventing windblown rain and insects from entering the attic through the ridge vent. As described above, the different fiber densities of the mesh mat 62 may be formed through any of a variety of techniques including needling techniques, air-laid techniques, blowing techniques, or combinations thereof.

Figure 6:
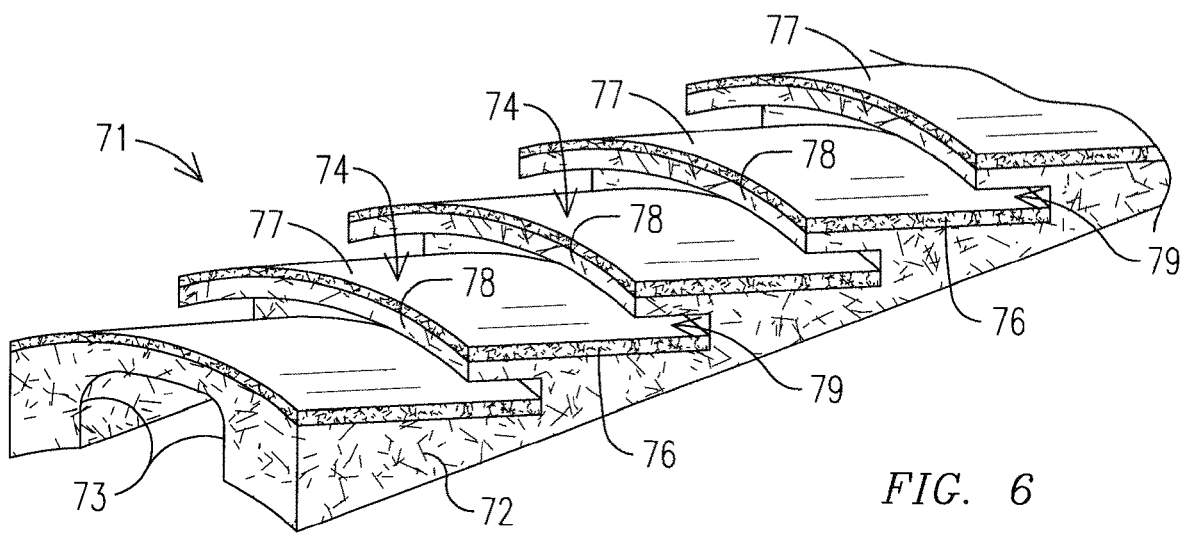
FIG. 6 is a perspective view of a mesh ridge vent with an upper surface contoured to receive ridge cap shingles.

FIG. 6 is a perspective view of a ridge vent 71 that embodies principles of the invention disclosed herein in yet another configuration. The ridge vent 71 comprises a mesh mat 72 that is shaped and configured during fabrication to define on its underside a gap 73 flanked by a pair of depending edges portions. When installed, the gap 73 overlies a ridge slot formed along the ridge of a roof and the depending edge portions rest on the shingles of the roof to each side of the ridge slot. The upper surface of the mesh mat 72 is formed to define a series of sloped lands 77 that extend to exposed edge portions 78. A slot 79 is formed between the edge portion 78 of each land and the top surface of the next land. The exposed surfaces of the lands 77 may have a moisture barrier 76 formed on or fixed thereto, but such a moisture barrier is not a requirement. During installation, the ridge vent 71 is rolled out along the ridge of a roof and positioned such that the gap 73 overlies a ridge slot formed along the roof ridge. The ridge vent 71 can then be attached to the roof deck with fasteners driven through the edge portions of the vent and into the roof deck below. Ridge cap shingles can be installed by sliding each ridge cap shingle into a corresponding slot 79, temporarily bending back the overlying edge portion 78, and installing roofing nails through the ridge cap shingle and into the roof deck below. The edge portion can then be laid back down to overlie the edge of the ridge cap shingle and hide the nails with which the ridge cap shingle was installed.

Figure 7:
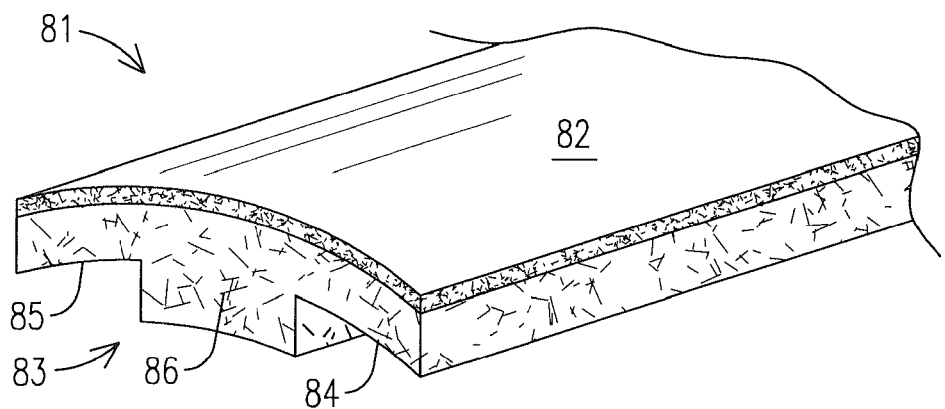
FIG. 7 is a perspective view of a mesh ridge vent having a depending tab sized to fit into a ridge slot to align and secure the ridge vent.
Figure 8:
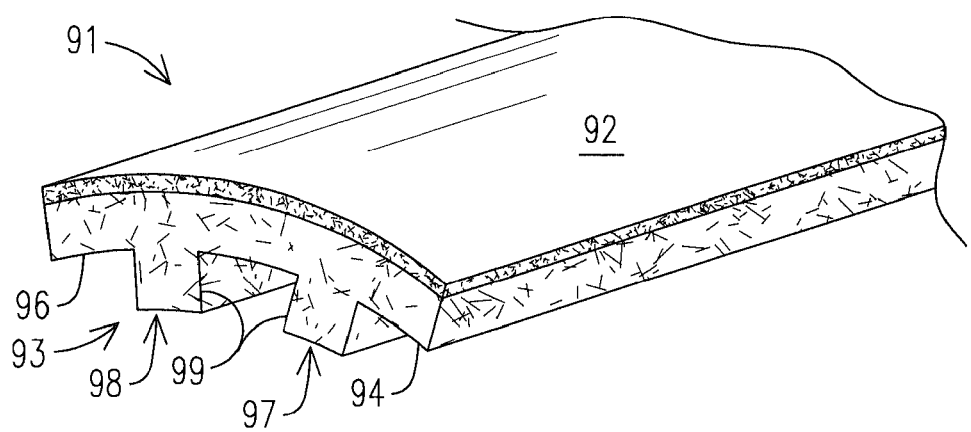
FIG. 8 is a perspective view of a mesh ridge vent having depending tabs sized to fit into a ridge slot and to accommodate a ridge beam.

FIG. 7 illustrates a contoured ridge vent of another configuration according to aspects of the disclosure. The ridge vent 81 comprises a moisture barrier 82 from which a fiber mesh mat 83 depends. The mesh mat 83 is contoured during fabrication to define air permeable edge portions 84 and 85 and a depending central plug 86. If desired, the central plug may comprise a region of relatively lower fiber density and the edge portions may comprise regions of relatively higher fiber density. The central plug 86 is sized to extend into a ridge slot formed along the ridge of a roof when the ridge vent 81 is installed along the ridge. In this way, the central plug fills the ridge slot and insures that the ridge vent 81 is properly positioned and centered along the ridge of a roof. The configuration of FIG. 7 is designed to be used with a roof structure that does not include a central ridge beam. FIG. 8, on the other hand, represents the same concept for use with a roof structure having a central ridge beam extending beneath its ridge. More specifically, a gap 99 is formed along the depending plug of the fiber mesh mat and this gap fits over the central ridge beam below when the plug is extended onto a ridge slot.

Figure 9:
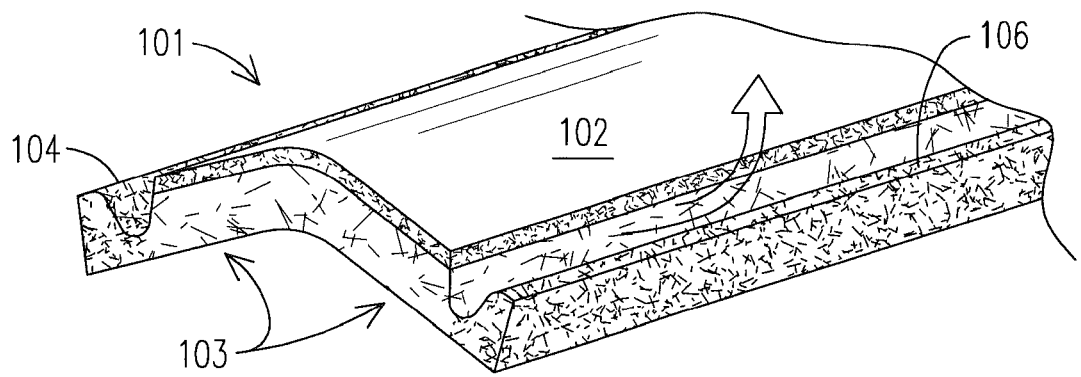
FIG. 9 is a perspective view of a mesh ridge vent contoured to form outboard wind baffles.

FIG. 9 illustrates a ridge vent of yet another configuration embodying aspects of the invention. The ridge vent 101 comprises a moisture barrier 102 forming an upper surface of a mesh mat 103. The mat 103 is formed during fabrication to define a pair of upstanding wind baffles 104 and 106 along its outboard edges. Edge portions of the air permeable mat 103 are exposed just inboard of the wind baffles and heated attic air can escape from an attic below through these exposed edge portions, as indicated by the arrow in FIG. 9. The wind baffles 104 and 106 can be formed by any of the methods discussed above and, as known in the art, help to draw air out of the attic by creating vortices during a breeze. The wind baffles 104 and 106 may comprise regions of relatively high fiber density while the remainder of the mat 103 may comprise a region of relatively low fiber density, also accomplished through any of the fabrication techniques discussed above.

Figure 10:
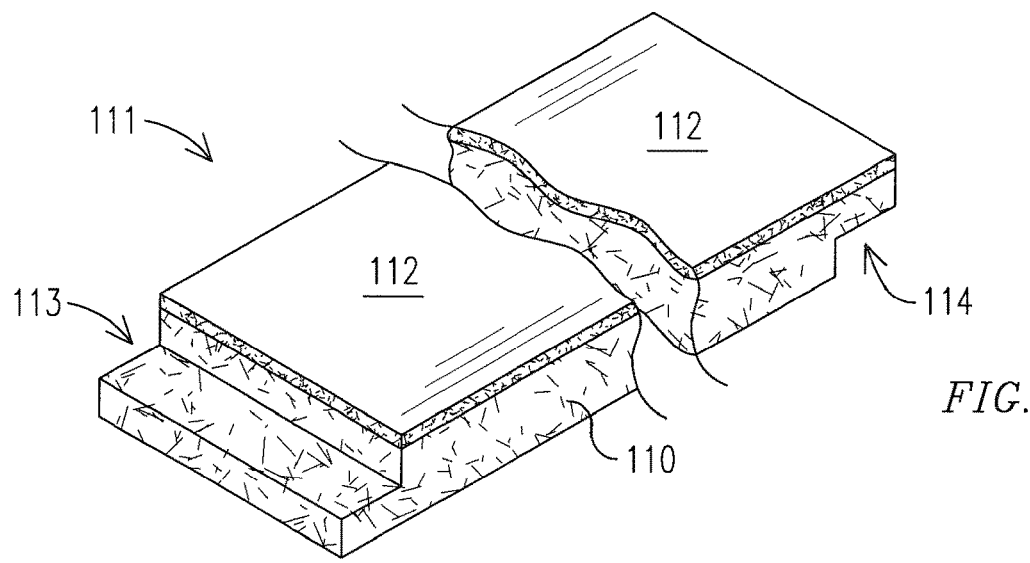
FIG. 10 is a perspective view of a section of mesh ridge vent contoured on its ends to interface with like ridge vent sections.
Figure 11:
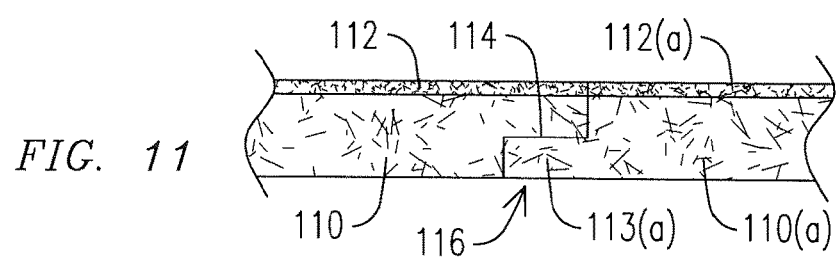
FIG. 11 is a side elevational view of two sections of the mesh ridge vent of FIG. 10 joined together at their ends.

FIG. 10 illustrates another ridge vent that embodies aspects of the invention. Many mesh-type ridge vents in the market are stored and shipped in spiral rolls of long sections of vent. However, there are some advantages to ridge vents made in relatively short sections of, for example, 4 feet, which are shipped stacked atop one another in boxes. Molded plastic ridge vents generally are formed in such short sections and stacked for shipment. FIG. 10 shows an embodiment of a mesh-type ridge vent that is made in relatively short sections that can be shipped in stacked configurations rather than in rolled configurations. The ridge vent section 111, which may be about 4 feet long, comprises a mesh mat 110 topped by a substantially impervious moisture barrier 112. A first end 113 of the ridge vent section is formed with an upwardly facing rabbet and a second end 114 of the ridge vent section is formed with a downwardly facing rabbet. These rabbets facilitate the joining of like ridge vent sections end-to-end along the ridge of a roof. More specifically, as shown in FIG. 11, when two ridge vent sections are joined at their ends, the downwardly facing rabbet 114 of one section meshes with the upwardly facing rabbet 113(a) of the other ridge vent section. This forms a shiplap joint 116 between the two sections. Caulk or other adhesive may be applied to the surfaces of the rabbets to join the two ridge vent sections together with a moisture resistant joint.

Figure 12:
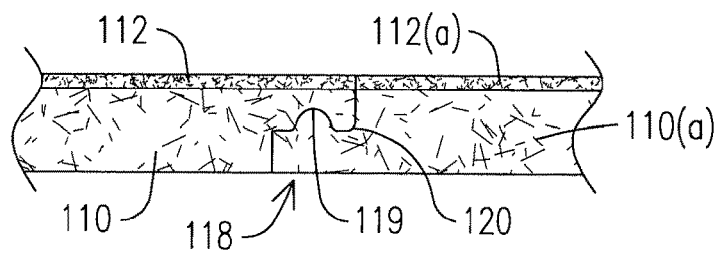
FIG. 12 is a side elevational view of two mesh ridge vent sections joined at their ends with alternate interlocking end configurations.

FIG. 12 illustrates a ridge vent configuration similar to that of FIGS. 10 and 11. Here, however, rather than rabbets, one end of each ridge vent is formed with an upwardly facing interlock having a ridge and a trough and the other end is formed with a downwardly facing interlock having a complementary ridge and trough. When two ridge vents are joined together end-to-end, the ridge of the upwardly facing interlock nestles within the trough of the downwardly facing interlock as indicated with reference numeral 119 in FIG. 12. At the same time, the ridge of the downwardly facing interlock nestles within the trough of the upwardly facing interlock as indicated with reference numeral 120 in FIG. 12. This forms a more secure and better aligned joint between the two ridge vent sections. Caulking or adhesive may be used to secure the joint if desired, and the ridges and troughs improve the moisture penetration resistance of the joint.

Figure 13:
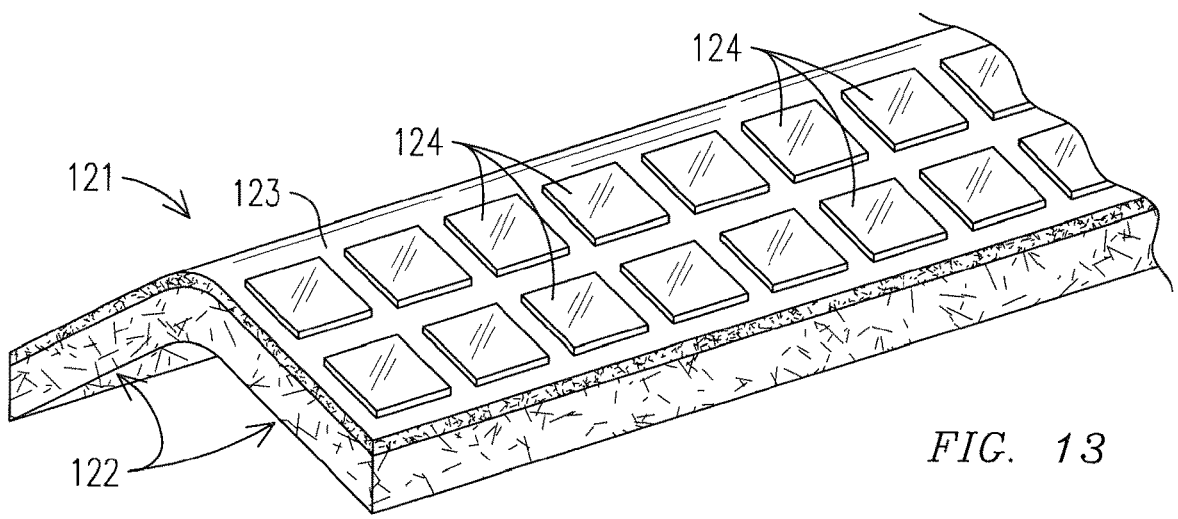
FIG. 13 is a perspective view of a mesh ridge vent with exposed solar energy collectors arrayed along its upper surface.

FIG. 13 illustrates a ridge vent embodying another aspect of the invention exemplified herein. The ridge vent 121 comprises a fiber mesh mat 122 with a moisture barrier 123 formed on the upper surface. The mesh mat 122 may have differing fiber densities as discussed above or may be configured or otherwise shaped in any way such as those ways discussed above. An array of solar energy collectors such as solar cells 124 is disposed along the upper exposed surface of the ridge vent 121 for collecting energy from the sun and converting that energy to electrical energy. The solar cells 124 may be electrically coupled together with an appropriate wiring grid contained within the moisture barrier of the ridge vent and connections may be provided for electrically coupling a length of solar ridge vent to a main electrical grid of a building. Solar cells may be applied to only one half of the ridge vent 121 for installations where a roof ridge extends east-to-west and only one side receives sunlight. Alternatively, solar cells may be applied to each side of the ridge vent 121 for installations where a roof ridge extends north-to-south or is otherwise oriented so that both sides of the ridge vent receive sunlight.

Figure 14:
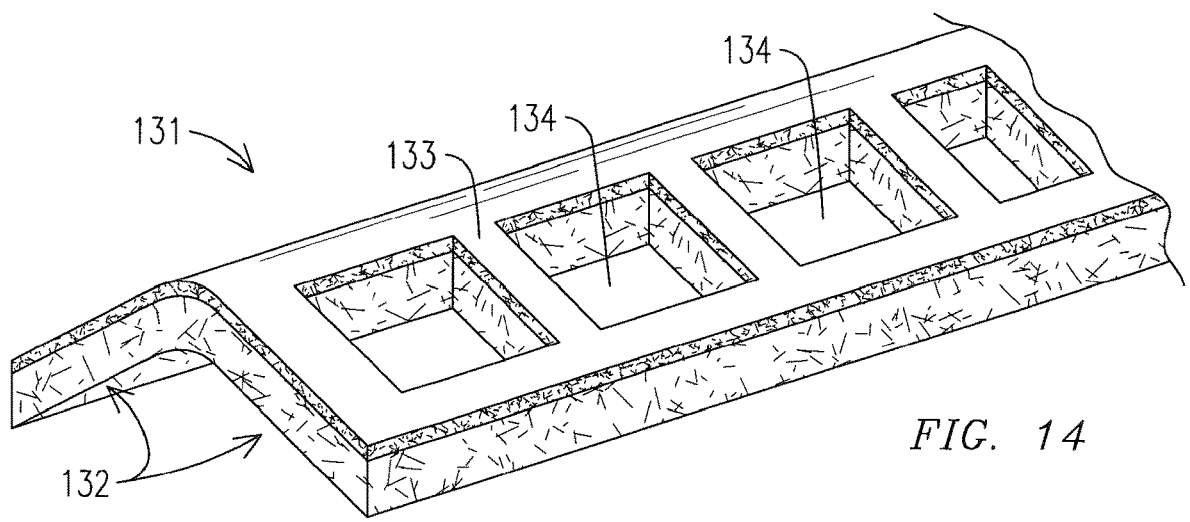
FIG. 14 is a perspective view of a mesh ridge vent formed with openings for admitting light that may then be directed into a home.

FIG. 14 illustrates another ridge vent configuration according to aspects of the invention. The ridge vent 131 includes an air permeable fiber mesh mat 132 having a moisture barrier 133 formed on or attached to the upper surface thereof. The mat in the drawing is of uniform thickness, but may be formed in any configuration with or without varying density, as described above. Arrays of windows 134 are formed in the ridge vent 131 and communicate therethrough. The windows 134 are rectangular in the illustrated embodiment, but may be formed with other shapes as needed or desired. The windows 134 function to reduce the weight of the ridge vent 131 while not interfering with the ventilation properties of the vent. Further, the windows admit light through the ridge vent. This light can be captured beneath the ridge vent and directed to the inside of a home or other structure using known devices such as light tunnels or fiber optic lighting systems. A transparent or translucent ridge cap or cover may be applied to the top of the ridge vent 131 to prevent water penetration if desired or transparent panes may be mounted in the windows for similar purposes.

Figure 15:
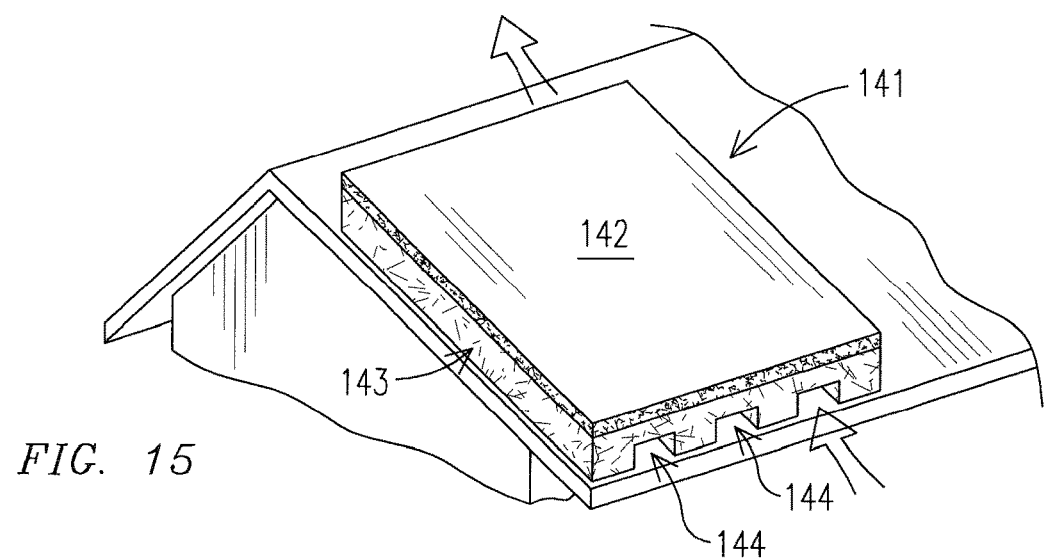
FIG. 15 is a perspective view of a roof deck mat made of mesh material for ventilating and cooling a roof deck.

FIG. 15 illustrates a manifestation of the invention that is not a ridge vent, but rather a ventilating roof cover to be installed between a roof deck and roof shingles. The roof cover 141 includes a fiber mesh mat 143 having a moisture barrier 142 formed on, attached to, or otherwise incorporated on its upper surface. The mesh mat 143 is formed or configured with a series of ventilation channels 144 that extend from a lower portion of a roof deck to an upper portion of the roof deck when the roof cover is installed as shown in FIG. 15. The roof cover is then covered with roof shingles in the traditional manner. As the roof shingles heat in the sun, the heat is transferred to the air within the ventilation channels. This causes the air to flow by convection toward the upper portion of the roof, where it can be expelled to ambience as indicated by the upper arrow in FIG. 15. This, in turn, draws cool air into the ventilation channels from the lower portion of the roof as indicated by the lower arrow in FIG. 15. The result is that the roof deck is continually ventilated and cooled, the shingles are maintained at a lower temperature in hot sun, and less heat is transferred to the attic space below. The fiber density of the mesh of the roof cover is selected so that the mat supports the weight of the shingles above and withstands installation of the shingles.

Figure 16:
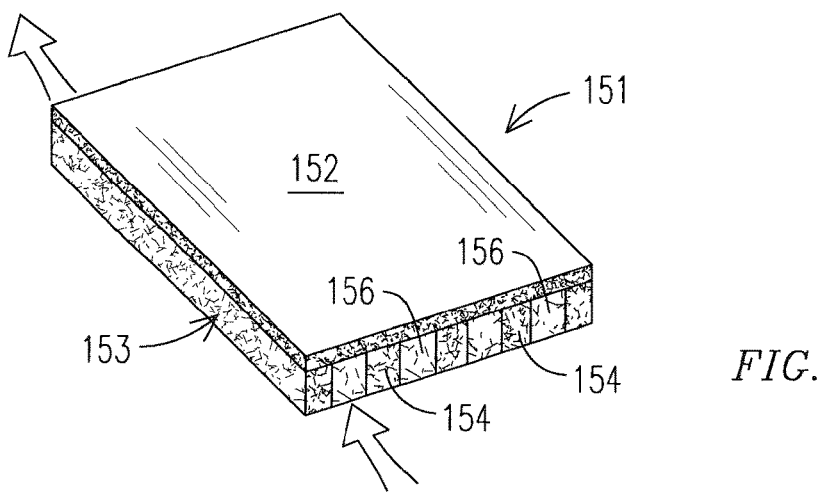
FIG. 16 is a perspective view of an alternate embodiment of a roof deck mat made of mesh material for ventilating and cooling a roof deck.

FIG. 16 is an alternate embodiment of a roof cover for ventilation of a roof deck exposed to the sun. The roof cover 151 includes a fiber mesh mat 153 that is formed with regions 154 having higher fiber density and regions 156 having lower fiber density. The mesh mat 153 may have a moisture barrier on its upper surface. The roof cover of FIG. 16 functions in a manner similar to that of FIG. 15, except that instead of ventilation channels, the mesh mat has regions of lower fiber density extending from a lower portion of the roof to an upper portion of the roof. The regions of higher fiber density support the roof cover and weight of shingles above while the regions of lower fiber density allow for the relatively free flow of ventilation air beneath the roof cover as indicated by the arrows in FIG. 16.

The invention has been described herein in terms of preferred embodiments and methodologies considered by the inventors to represent the best modes of carrying out the invention. It will be understood by the skilled artisan; however, that a wide range of additions, deletions, and modifications, both subtle and gross, may be made to the illustrated and exemplary embodiments without departing from the spirit and scope of the invention set forth in the claims.

What is claimed is:

1. A ridge vent comprising:
    an elongated strip of fibrous material comprising randomly aligned fibers joined by binding agents and cured to produce an air-permeable mat having a top side, a bottom side, opposed edge portions, and a central portion between the opposed edge portions;
    the air-permeable mat being sized to be installed along a ridge or hip of a roof covering a ventilation slot formed along the ridge or hip;
    wherein, when the ridge vent is installed along the ridge or the hip of the roof, the bottom side of the air-permeable mat directly contacts the roof;
    the air-permeable mat having a longitudinally extending air gap formed in the fibrous material along the bottom side of the air-permeable mat;
    wherein the air gap separates the opposed side portions and is configured to facilitate bending of the air-permeable mat along the central portion of the air-permeable mat; and
    a moisture barrier on the top side of the air-permeable mat and configured to reduce rainwater from penetrating into the air-permeable mat when the ridge vent is installed along the ridge or hip of the roof;
    wherein the moisture barrier is integrated with the air-permeable mat so as to bend therewith and form an outermost exposed surface of the ridge vent when the ridge vent is installed along the ridge or hip of the roof;
    wherein the ridge vent is configured to be installed along the ridge or hip of the roof without a cap shingle installed on top of the moisture barrier.

2. The ridge vent of claim 1 wherein the air gap extends generally along a longitudinal center line of the air-permeable mat.

3. The ridge vent of claim 1 wherein the air gap is generally V-shaped to accommodate folding of the ridge vent along a longitudinal center thereof.

4. The ridge vent of claim 1, wherein the moisture barrier comprises a coating of a water resistant material applied to the air-permeable mat, a membrane affixed to the air-permeable mat, a layer of fibrous material attached to the air-permeable mat and having a density configured to resist penetration of water therethrough, a layer of fibers including an amount of resin sufficient to close spaces between the fibers against penetration of water attached to the air-permeable mat, a mat of water impervious material affixed to the air-permeable mat, or combinations thereof.

5. The ridge vent of claim 1, wherein the fibrous material of the air-permeable mat comprises at least a first region of fibers having a first resistance to a flow of air therethrough, and at least a second region of fibers having a second resistance to the flow of air that is greater than the first resistance.

6. A roof vent for installation along a ridge or hip of a roof covering a ventilation slot, the roof vent having longitudinally extending opposed edge portions flanking a longitudinally extending central portion and having an upper layer that is substantially impermeable to moisture, and a lower layer beneath the upper layer and integrated with the upper layer, the lower layer comprising an open weave mat that permits a flow of air therethrough from the central portion of the roof vent toward the edge portions of the roof vent, at least one region of the open weave mat having an air gap formed in a bottom surface of the open weave mat and extending longitudinally along the central portion of the roof vent, the air gap configured to facilitate folding of the roof vent over the ridge or hip of the roof; and wherein, when the roof vent is installed along the ridge or the hip of the roof, the open weave mat directly contacts the roof;

wherein the upper layer comprises a moisture barrier integrated with the open weave mat so as to be foldable therewith, and is configured to reduce rainwater from penetrating into the open weave mat when the ridge vent is installed along the ridge or hip of a roof;

wherein the roof vent is configured to be installed along the ridge or hip of the roof without a cap shingle being applied over the moisture barrier of the roof vent, and with the moisture barrier forming an outermost surface of the roof vent.

7. The roof vent of claim 6, wherein the moisture barrier comprises a coating of a water resistant material applied to the open weave mat, a membrane affixed to the open weave mat, a layer of fibrous material attached to the open weave mat and having a density configured to resist penetration of water therethrough, a layer of fibers including an amount of resin sufficient to close spaces between the fibers against penetration of water attached to the open weave mat, a mat of water impervious mat affixed to the open weave mat, or combinations thereof.

8. The roof vent of claim 6, wherein the air gap is generally V-shaped to accommodate folding of the roof vent.

9. The roof vent of claim 6, wherein the open weave mat comprises a plurality of randomly aligned fibers joined by binding agents and cured to produce an air-permeable fibrous mat.

10. The roof vent of claim 6, wherein the open weave mat comprises at least a first region of fibers having a first resistance to the flow of air therethrough, and at least a second region of fibers having a second resistance to the flow of air that is greater than the first resistance.

11. A roof system, comprising:
a roof deck;
a ridge or extending along the roof deck and having a ridge slot extending therealong;
a plurality of ridge vents positioned along the ridge or hip and configured to cover the ridge slot;
wherein each of the ridge vents comprises:
an air-permeable mat having a top side, a bottom side, opposed edge portions, and a central portion between the opposed edge portions;
wherein the air-permeable mat includes a longitudinally extending air gap formed along the bottom side of the air permeable mat;
wherein the air gap separates the opposed side portions and is configured to facilitate bending of the air-permeable mat along the central portion of the air-permeable mat;
wherein, when the ridge vent is installed along the ridge or the hip of the roof, the bottom side of the air-permeable mat directly contacts the roof deck with the air gap overlying the ridge slot; and
a moisture barrier applied along the top side of the air-permeable mat and configured to reduce rainwater from penetrating into the mat when the ridge vent is installed along the ridge or hip of the roof;
wherein the moisture barrier is integrated with the air-permeable mat so as to bend with the air-permeable mat and forms an outermost exposed surface of the ridge vent when the ridge vent is installed along the ridge or hip of the roof;
wherein the ridge vent is configured to be installed along the ridge or hip of the roof and secured to the roof deck without a cap shingle installed over the moisture barrier.

12. The roof system of claim 11, wherein the moisture barrier comprises a coating of a water resistant material applied to the air-permeable mat, a membrane affixed to the air-permeable mat, a layer of fibrous material attached to the air-permeable mat and having a density configured to resist penetration of water therethrough, a layer of fibers including an amount of resin sufficient to close spaces between the fibers against penetration of water attached to the air-permeable mat, a mat of water impervious material affixed to the air-permeable mat, or combinations thereof.

13. The roof system of claim 11, wherein the air gap extends along a longitudinal center line of the air-permeable mat.

14. The roof system of claim 11, wherein the air gap comprises a V-shaped notch configured to accommodate folding of the ridge vent along a longitudinal center thereof.

15. The roof system of claim 11, wherein the air-permeable mat comprises a plurality of randomly aligned fibers joined by binding agents and cured to produce the air-permeable mat.

16. The roof system of claim 11, wherein the air-permeable mat includes a first plurality of fibers having a first fiber density and at least a second plurality of fibers having a second fiber density that is lower than the first fiber density.

17. The roof system of claim 11, wherein the air-permeable mat comprises a fibrous material having at least a first region of fibers having a first resistance to a flow of air therethrough, and at least a second region of fibers having a second resistance to the flow of air that is greater than the first resistance.

* * * * *